(12) United States Patent
Reiter et al.

(10) Patent No.: US 7,532,558 B2
(45) Date of Patent: May 12, 2009

(54) DATA RECORDING METHOD AND DATA RECORDING MEDIUM

(75) Inventors: Gottfried Reiter, Adnet (AT); Josef Schuller, Salzburg (AT); Klaus Holzapfel, Kuchl (AT); Günther Kattner, Hallein (AT)

(73) Assignee: Sony DADC Austria AG, Anif (AT)

( * ) Notice: Subject to any disclaimer, the term of this patent is extended or adjusted under 35 U.S.C. 154(b) by 385 days.

(21) Appl. No.: 10/732,040

(22) Filed: Dec. 9, 2003

(65) Prior Publication Data

US 2004/0130996 A1 Jul. 8, 2004

(30) Foreign Application Priority Data

Dec. 13, 2002 (EP) ................... 02027921

(51) Int. Cl.
*G11B 20/14* (2006.01)
*G11B 7/00* (2006.01)

(52) U.S. Cl. .............................. 369/59.24; 369/124.04; 341/50

(58) Field of Classification Search ........................ None
See application file for complete search history.

(56) References Cited

U.S. PATENT DOCUMENTS

| | | | |
|---|---|---|---|
| 4,539,691 A * | 9/1985 | Ogawa et al. ............... | 375/259 |
| 5,703,858 A | 12/1997 | Mitchell et al. | |
| 6,526,385 B1 * | 2/2003 | Kobayashi et al. .......... | 704/504 |
| 2001/0028318 A1 | 10/2001 | Hogan | |

FOREIGN PATENT DOCUMENTS

| WO | WO 91 12611 | 8/1991 |
|---|---|---|
| WO | WO 02 11136 | 2/2002 |
| WO | WO 02/39447 | 5/2002 |
| WO | EP 1 355 306 | 10/2003 |

\* cited by examiner

*Primary Examiner*—Joseph H Feild
*Assistant Examiner*—Parul Gupta
(74) *Attorney, Agent, or Firm*—Oblon, Spivak, McClelland, Maier & Neustadt, P.C.

(57) ABSTRACT

A system for modulating digital binary data to be recorded on a recording medium comprises the generation of channel bits of the digital binary data to be recorded according to a standard for the recording medium with the exception that a maximum run length larger than that defined in the standard is obtained and/or the merging decision is influenced on basis of a random noise in a predetermined pattern or in at least one predetermined position on said recording medium and/or by recording at least one part comprising at least one predetermined repetitive bit pattern which normally, i.e. according to the standard for the recording medium, encodes into channel bits having a spectral distribution that shows at least one range of frequencies with a characteristic amplitude distribution.

17 Claims, 7 Drawing Sheets a)

b)

DATA RECORDING METHOD AND DATA RECORDING MEDIUM

Figure 1:
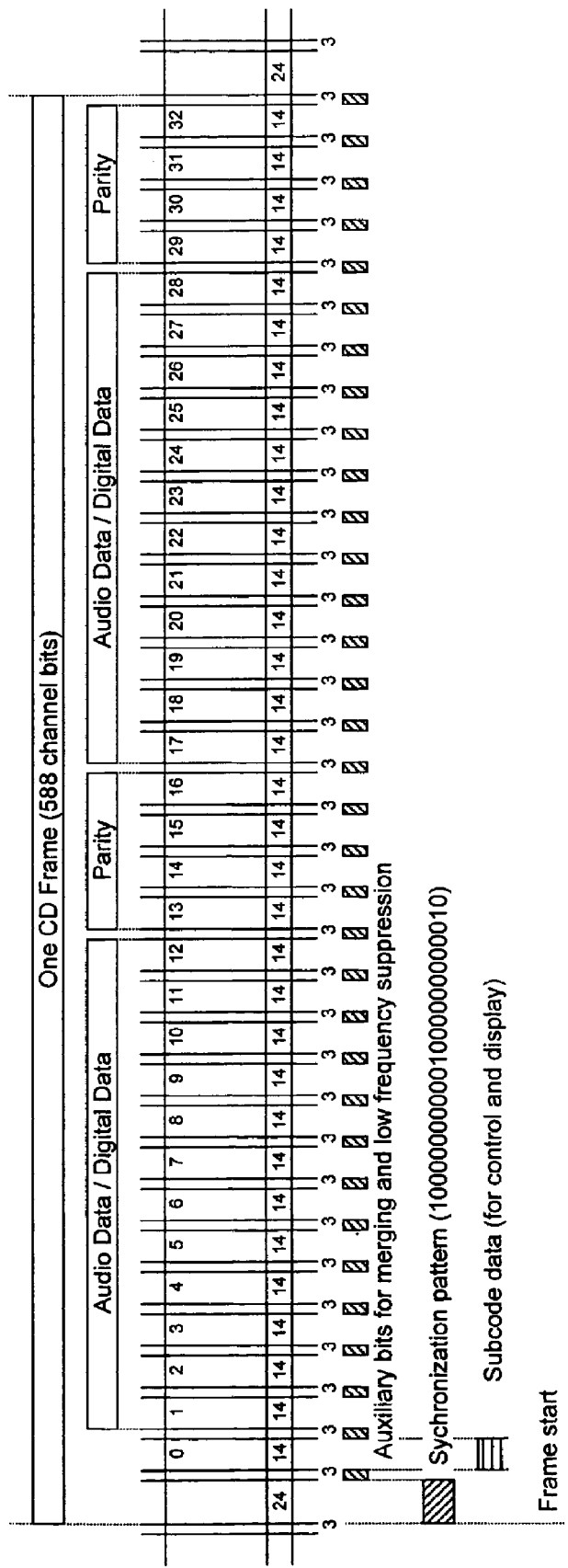

The present invention relates to a data recording method and device for recording media, i.e. record carriers or storage media, which store digital data as an asynchronous signal, e.g. Compact Discs (CDs) and Digital Versatile Discs (DVDs) including all existing or future formats of CD and DVD as well as recordable or rewritable Storage Media or other Optical Storage Media which work according to a similar concept, e.g. CD-R, CD-RW, DVD-R, DVD+R, DVD-RW, DVD+RW, MO-media, . . . . Further, the present invention relates to such a recording medium itself.

In particular, the present invention relates to a method and device for modulating digital binary data to be recorded on a recording medium, i.e. to a special part of a recording method and device. Further, the data modulating method and device according to the present invention is particularly suited for recording data that confuses reading devices on basis of tracking and/or focussing errors that cannot be compensated when the data is normally recorded, e.g. for copy protection purposes, as set out below. Therefore, the present invention also relates to a method and a device to produce a copy protected recording medium for digital data.

Further, the present invention relates to a method and/or a device for verifying a recording medium according to the present invention, in particular for the case that the data modulating method and/or device according to the present invention as such are used as a copy protection system for recording media.

Still further, the present invention relates to a method to copy digital data stored on a recording medium with copy protection according to the present invention onto a recordable recording medium, i.e. an evasion of the copy protection system according to the present invention.

Optical storage discs with information stored on one or both sides have come to be used for a variety of purposes, most notably in the music, games, video, and computer industry. Digital information is stored on the optical storage media in the form of pits arranged along circular, concentric tracks on one or on both sides of the disc. The track is typically read from the inside out, but may also be read form outside in, as it is already used for some optical storage media.

The data itself on the track is subdivided into frames, each equal in length, containing equal amounts of information. Each frame has a dedicated layout depending on the type of optical storage media (CD, DVD). Such a frame always contains the user data symbols itself but may also contain data for synchronization, merging data between data symbols and error correction.

The signal on an optical storage medium itself is asynchronous, which means that in the decoding process synchronization, timing information, parity data or other data has to be spied out from the signal and the signal has to fulfil certain requirements so that it is accessible by a reading device.

Due to the nature of such storage media copies can be made easily. To cope with this situation, there exist various copy protection schemes, in particular U.S. Pat. No. 5,699,434, EP 0 791 923 A2 and WO 02/11136 A1, which content is herewith respectively included by reference into this specification, disclose a method of inhibiting copying of digital data according to which a sequence of symbols is added to the original data, wherein the sequence of symbols is selected to encode into channel bits having a large accumulated digital sum variance (DSV). These methods are based on encoding and merging according to the standards for the storage media, like the "Red Book" or a "Yellow Book" for compact discs.

However, according to this copy protection method always a special encoder is necessary that needs to be adapted to encode the selected sequence of symbols that would normally encode into channel bits having an accumulated digital sum variance that exceeds a predetermined limit non-optimally into channel bits having an accumulated digital sum variance that does not exceed the predetermined limit, in particular the teaching given in all three documents requires to choose merging bits that are non-optimal in the short term evaluation of the DSV, but that compensate a high DSV in on a long term basis.

Further, since these methods for encoding and merging are strictly working according to the respective standard and the compensation of the high DSV is only performed based on a look ahead, the to be inserted sequence of symbols is very restricted to predetermined patterns and is difficult to evaluate. The proposed methods will only show a performance in case different merging possibilities exist within the respective blocks of 12 byte of user data, e.g. audio data and/or digital data. The proposed methods will not work in case of a predetermined bit pattern that leads to a high or steadily increasing DSV and that does not allow different merging possibilities, since only one possible merging possibility is predefined due to the pattern, e.g. as set out below in case of a repetitive recording of 7001h, which results in that no non optimal short-term merging bits can be chosen to achieve a low DSV on a long-term basis.

Further, the European patent application with application number EP 02 008 668.2 "Copy Protection System for Optical Discs" which was filed on Apr. 14, 2002 by the same applicant as this invention, which content is herewith included by reference into this specification, discloses a system for copy protection of record carriers for digital data according to which at least one predetermined repetitive bit pattern which automatically encodes into channel bits having an accumulated digital sum value that exceeds a first predetermined limit and that is below a second predetermined limit is determined and recorded onto said record carrier by a mastering process so that said accumulated digital sum value which exceeds said first predetermined limit and is below said second predetermined limit is achieved in said at least one replaced and/or inserted part, wherein said limits are chosen so that an original record carrier can basically be accessed, but a copy thereof cannot be accessed or shows not tolerable or correctable errors and wherein the optimal encoding according to the specification of the respective record carrier is used.

In contrast to the methods proposed in the above-referenced U.S. Pat. No. 5,699,434, EP 0 791 923 A2 and WO 02/11136 A1, the "Copy Protection System for Optical Discs" according to EP 02 008 668.2 suggests to use repetitive bit patterns within the user data that leave only one merging possibility to generate a steadily increasing DSV, since such patterns are very effective.

However, using this system of including specially selected bit patterns that encode into channel bits, e.g. according to the EFM encoding, which channel bits produce a high accumulated digital sum value might lead to a non-accessibility or disturbed accessibility even of the original record carrier on some record carrier reading devices that are sensitive thereto.

Also a combination with the above described look ahead merging might then only be applied to the merging within the parity bits, i.e. at two positions within a CD frame the possibility of different merging possibilities might exist. In this case automatically a modulation of the resulting channel bits with a frequency band having a medium frequency of 7350 Hz would occur, since 7350 CD frames exist within one second. In case different merging possibilities exist only at one position per CD frame, the frequency will be reduced to a frequency band with a medium frequency of 3675 Hz. The look ahead merging might then determine a particular merging pattern at these possible positions, i.e. in this case one merging possibility might be skipped, which corresponds to a reduction of the frequency. Since, however, a CD player is more sensitive to low frequency disturbances, the look ahead merging according to U.S. Pat. No. 5,699,434, EP 0 791 923 A2 and WO 02/11136 A1 would lead to a even worse playability of discs comprising the predetermined repetitive bit pattern that allows only one merging possibility within the user data.

An increased DSV might also occur when, e.g. in case of CD-audio formats, audio data with a constant level is recorded, e.g. in pauses in which the level is not reduced to zero.

Therewith, although the normally used coding algorithms, e.g. EFM for CDs, aim to minimize the DSV in the raw data stream, i.e. that data stream that is used to modulate the laser beam for the production of the glass master or for the recording of a recordable or rewritable recording medium, sometimes a high DSV will occur or is even wanted, at least in the copies of an original record carrier.

This data that leads to the high DSV also might lead to an increased tracking error signal, i.e. the signal that indicates the displacement of the reading unit in respect to the track when the tracking control is activated, and/or to an increased focus error signal so that some players will even not accept the original record carrier although this original record carrier might be recorded according to the above described methods.

To cope with this situation, systems as described in the European Patent Applications EP-A-02 019 778.6 "Method and Device to Produce an Optical Disc" and EP-A-02 019 779.4 "Recording System for Optical Discs", which respective content is herewith included by reference into this specification, are developed that allow to produce such optical discs that compensate the introduced tracking error on basis of a special writing technology for the original record carrier. However, due to the existing introduced focussing error, the original record carriers provided with such a copy protection system might still be inaccessible by some of the reading devices.

Therefore, it is the object underlying the present invention to provide a method and device for modulating digital binary data to be recorded on a recording medium, as well as such a recording medium itself, which ensure a higher grade of accessibility of (originally) produced recording media, and/or to provide a further copy protection system for recording media which store digital data as an asynchronous signal.

The respective methods for modulating digital binary data to be recorded on a recording medium according to the present invention are defined in independent claims 1 and 8. Preferred embodiments thereof are defined in the dependent claims 2 to 7 and 9 to 16. The devices for modulating digital binary data to be recorded on a recording medium according to the present invention are defined in independent claims 32 and 35. Preferred embodiments thereof are defined in the dependent claims 33, 34 and 36 to 40. A recording medium according to the present invention is defined in independent claim 49 and preferred embodiments thereof are defined in dependent claim 50 and 51. The method to produce a copy protected recording medium for digital data according to the present invention is defined in independent claim 17 and preferred embodiments thereof are defined in claims 18 to 21. The device to produce a copy protected recording medium for digital data according to the present invention is defined in independent claim 41, a preferred embodiment thereof is defined in claim 42. The respective methods for verifying a recording medium according to the present invention are defined in independent claims 22 to 24, claim 25 defines a preferred embodiment of one of the methods for verifying a recording medium according to the present invention. The respective devices for verifying a recording medium according to the present invention are defined in independent claims 43 to 45. The respective methods for copying digital binary data recorded on an original recording medium onto a copied recording medium according to the present invention are defined in independent claims 26 to 28, claim 29 defines a preferred embodiment of one of the methods for copying digital binary data recorded on an original recording medium onto a copied recording medium according to the present invention. The respective devices for copying digital binary data recorded on an original recording medium onto a copied recording medium according to the present invention are defined in independent claims 46 to 48. A computer program product according to the present invention is defined in claim 30 and a computer readable storage means according to the present invention is defined in claim 31.

In particular, the above outlined system according to the present invention as defined in claims 1 to 51 and further set-out below is suited for the recording of recording media that comprise data, which allows to make a physical copy or to create a complete data image of the media content, but the physical copy itself or a new recording of the data image or even the raw data of the media content is not accessible anymore or the access is disturbed or that the error rate is increased dramatically so that e.g. listening to the music content of a copied audio record is not entertaining anymore. The methods and devices for modulating digital binary data to be recorded on a recording medium, the methods and devices for verifying a recording medium, and the methods and devices for copying digital binary data recorded on an original recording medium onto a copied recording medium according to the present invention have the common concept to be based on a modulation that deviates from the standard of a respective record carrier, but which does not affect the reading operation of a standard reading device. Such a modulation is in particular needed to assure the reading of recorded repetitive bit patterns that have a characteristic spectral distribution that leads to inaccessibility in case of a recording with a modulation according to the standard. These predetermined repetitive bit patterns are used in the method and device to produce a copy protected recording medium for digital data according to the present invention. The recording medium according to the present invention also reflects this common concept.

The first method for modulating digital binary data to be recorded on a recording medium according to the present invention comprises the step of: generating channel bits of the digital binary data to be recorded according to a standard for the recording medium with the exception that a maximum run length larger than that defined in the standard is allowed and/or obtained, i.e. generated, in a predetermined pattern or in at least one predetermined position on said recording medium.

The first device for modulating digital binary data to be recorded on a recording medium generally comprises:

an encoder to convert a next to be processed m-bit data-symbol of the digital binary data into at least one currently converted n-bit data symbol, where m and n are positive integers and m<n, according to an encoding table normally used for producing said recording medium, and according to the present invention additionally comprises:

a merging unit to combine one of the at least one currently converted n-bit data symbol with previously converted n-bit data symbols according to a standard for the recording medium with the exception that a maximum run length larger than that defined in the standard is generated in a predetermined pattern or in at least one predetermined position on said recording medium.

The second method for modulating digital binary data to be recorded on a recording medium according to the present invention comprises the step of: generating channel bits of the digital binary data to be recorded according to a standard for the recording medium with the exception that the merging decision is influenced on basis of a random noise in a predetermined pattern or in at least one predetermined position on said recording medium.

The second device for modulating digital binary data to be recorded on a recording medium generally comprises:

an encoder to convert a next to be processed m-bit data-symbol of the digital binary data into at least one currently converted n-bit data symbol, where m and n are positive integers and m<n, according to an encoding table normally used for producing said recording medium, and according to the present invention additionally comprises:

a merging unit to combine one of the at least one currently converted n-bit data symbol with previously converted n-bit data symbols according to a standard for the recording medium with the exception that the merging decision is influenced on basis of a random noise in a predetermined pattern or in at least one predetermined position on said recording medium.

Therewith, in both methods and devices according to the present invention two different, but combinable copy protection schemes might be realized. First, a recording medium might be verified on basis of the presence or absence of the deviation from the standard. Second, a copied recording medium will not show the deviation from the standard, since the writing devices to produce the copy are working according to the standard and therewith the copied recording medium shows the standard specification, which might automatically lead to reading problems and/or inaccessibility of the copy, e.g. in case special data that generates a characteristic spectral distribution of the resulting standard modulated channel bits is included therein, which characteristic spectral distribution leads to severe reading problems or inaccessibility.

The recording resulting on basis of the modulation according to the present invention automatically shows a better accessibility, since channel bits that better fulfil requirements in respect to stability of reading devices will automatically be generated due to less constraints in respect to the maximum allowable run length and/or due to a random or pseudo random merging decision. This effect takes place, since for a recording, during the modulation, i.e. encoding and merging, of the data to be recorded, normally first all allowed different channel bit patterns are determined and then those channel bits of the determined bit patterns are selected that generate the lowest DSV. According to the first method and device according to the present invention a higher number of different channel bit patterns exists in comparison to the standard for a particular recording medium, since a longer run length is allowed. Therefore, a better possibility exists to keep the DSV low, in particular in case specially selected bit patterns are included in the data that drive the DSV high for a standard modulation. According to the second method and device according to the present invention an equalized spectrum of the resulting channel bits is generated in comparison to the standard for a particular recording medium, since different merging decisions are forced for the same recorded bit patterns, e.g. in case of repetitive recorded bit patterns which would in a standard modulation lead to a characteristic spectral distribution that disturbs reading devices up to an abortion. In particular, the regularity of the merging decisions according to the standard, including the look ahead merging as set out above, is interrupted according to the present invention by providing more than two positions with different merging possibilities, e.g. different merging possibilities at every merging position. Due to both proposed methods alone or in combination the DSV value will be more frequently, but not regularly allowed to change its direction from increasing to decreasing or vice versa. This leads to an equalized spectrum of the resulting channel bits that assures accessibility of the recording medium.

Of course, it is self evident that the deviations from the standard chosen according to the present invention are so low that reading devices will not have any problems in synchronizing and accessing the recording medium. Also, it is self evident that the respective standard deviation/s is/are usually not just once chosen to cover one position on the recording medium, but for a predetermined amount of data to be recorded in that position, i.e. for a predetermined amount of data symbols to be recorded, so as to be able to distinguish writing and/or reading errors from wanted deviations from the standard according to the present invention.

In a first preferred embodiment of the first method according to the present invention, preferably the following steps are included:

converting a next to be processed m-bit data-symbol of the digital binary data into a currently converted n-bit data symbol, where m and n are positive integers and m<n, according to an encoding table used for producing a compact disc, determining of all merging bit patterns that can be inserted between previously converted and the currently converted n-bit data symbols to generate channel bits in a manner that the minimum distance between two transitions is d channel bits and the maximum run length is k channel bits with k>d, determining a respective digital sum value and/or a respective frequency spectrum of the channel bits for every possibility of appending said currently converted n-bit data symbol to said previously converted n-bit data symbols and a respective merging bit pattern, and choosing that merging bit pattern to be inserted between the previously converted and the currently converted n-bit data symbols that generates the lowest digital sum value and/or an equally distributed spectral distribution of the channel bits.

Correspondingly, in a first preferred embodiment of the first device according to the present invention, said merging unit preferably comprises:

a merging bit pattern determination unit to generate different possible channel bits by respectively inserting one different of all allowed merging bit patterns between the previously converted and the currently converted n-bit data symbols, and a selection unit that selects those possible channel bits to be inserted between the previously converted and the currently converted n-bit data symbols that generate the lowest digital sum value and/or an equally distributed spectral distribution of the channel bits.

In a first alternative of a first preferred embodiment of the second method according to the present invention, preferably the following steps are included:

converting a next to be processed m-bit data-symbol of the digital binary data into a currently converted n-bit data symbol, where m and n are positive integers and m<n, according to an encoding table used for producing a compact disc, determining of all merging bit patterns that can be inserted between previously converted and the currently converted n-bit data symbols, adding a random or pseudo random number to the currently converted n-bit data symbol to obtain an influenced n-bit data symbol, determining a respective digital sum value and/or a respective spectral distribution of the channel bits for every possibility of appending said influenced n-bit data symbol to said previously converted n-bit data symbols and a respective merging bit pattern, and choosing that merging bit pattern to be inserted between the previously converted and the currently converted n-bit data symbols that generates the lowest digital sum value and/or an equally distributed spectral distribution of the channel bits.

Correspondingly, in a first alternative of a first preferred embodiment of the second device according to the present invention, said merging unit preferably comprises:

a first determination unit for determining of all merging bit patterns that can be inserted between the previously converted and the currently converted n-bit data symbols, an adding unit for adding a random or pseudo random number to the currently converted n-bit data symbol to obtain an influenced n-bit data symbol, a second determining unit for determining a respective digital sum value and/or a respective spectral distribution of the channel bits for every possibility of appending said influenced n-bit data symbol to said previously converted n-bit data symbols and a respective merging bit pattern, and a selection unit for choosing that merging bit pattern to be inserted between the previously converted and the currently converted n-bit data symbols that generates the lowest digital sum value and/or an equally distributed spectral distribution of the channel bits.

In a second alternative of a first preferred embodiment of the second method according to the present invention, preferably the following steps are included:

converting a next to be processed m-bit data-symbol of the digital binary data into a currently converted n-bit data symbol, where m and n are positive integers and m<n, according to an encoding table used for producing a compact disc, determining of all merging bit patterns that can be inserted between previously converted and the currently converted n-bit data symbols, determining a respective digital sum value for every possibility of appending said currently converted n-bit data symbol to said previously converted n-bit data symbols and a respective merging bit pattern, adding a random or pseudo random number to each of the respective digital sum values to obtain influenced digital sum values, and choosing that merging bit pattern to be inserted between the previously converted and the currently converted n-bit data symbols that generates the lowest influenced digital sum value and/or an equally distributed spectral distribution of the channel bits.

Correspondingly, in a second alternative of a first preferred embodiment of the second device according to the present invention, said merging unit preferably comprises:

a first determination unit for determining of all merging bit patterns that can be inserted between previously converted and the currently converted n-bit data symbols, a second determining unit for determining a respective digital sum value for every possibility of appending said currently converted n-bit data symbol to said previously converted n-bit data symbols and a respective merging bit pattern, an adding unit for adding a random or pseudo random number to each of the respective digital sum values to obtain influenced digital sum values, and a selection unit for choosing that merging bit pattern to be inserted between the previously converted and the currently converted n-bit data symbols that generates the lowest influenced digital sum value and/or an equally distributed spectral distribution of the channel bits.

This first preferred embodiment according to the present invention is directed to the CD format and formats derived therefrom, i.e. formats in that the channel bits are generated by arranging merging bit patterns that preferably respectively comprise 3 merging bits between the data symbols or encoded data symbols. According to the CD format as defined e.g. in the red book or yellow book standards, each symbol of 8 data bits is mapped onto 14 channel bits, i.e. EFM, and to each block of 14 channel bits 3 extra bits (merging bits) are added for merging the blocks and low frequency suppression so that in total 17 channel bits are generated from 8 data bits. The information is contained in the positions of the transitions, i.e. the modulated signal that drives the writing laser swaps its level from high to low or vice versa after each "1" within the code. According to the red book standard the code is generated in such a way that the minimum distance between 2 transitions is 3 channel bits and the maximum run length within the blocks is 11 channel bits. This rule is also referred to as run length limited (RLL) 2/10 code, i.e. (2, 10)-RLL, defining that the lowest number of consecutive "0" within the code is 2 and the maximum number of consecutive "0" within the code is 10. According to the present invention, however, this maximum number might be set to be higher in a predetermined pattern or in at least one predetermined position on said recording medium. Further, according to the red book or yellow book standards the code is generated in such a way that always those merging bits are selected that generate the lowest DSV (either on a short term or on a long term "look ahead" basis). According to the present invention, however, the merging decision is influenced on basis of a random noise so that a wanted deviation from the generation of the lowest DSV occurs.

Therefore, in the first preferred embodiment of the methods according to the present invention, preferably m=8 and n=14. Further, in the first preferred embodiment of the first method according to the present invention, preferably d=3 and k>11. Further preferably 11<k<20.

In a second preferred embodiment of the first method according to the present invention preferably the following steps are included:

converting a next to be processed m-bit data-symbol of the digital binary data into a predetermined number of different n-bit data symbols, where m and n are positive integers and m<n, according to an encoding scheme used for producing a digital versatile disc, with the exception that in case the m-bit data symbol is to be encoded with either the state 1 table/s or the state 4 table/s, n-bit data symbols for all state tables are generated, determining of all possibilities for appending a respective one of said n-bit data symbols to previously selected n-bit data symbols to generate channel bits in a manner that the minimum distance between two transitions is d channel bits and the maximum run length is k channel bits with k>d, and choosing that n-bit data symbol to generate the channel bits that generate the lowest digital sum value and/or an equally distributed spectral distribution of the channel bits.

Correspondingly, in a second preferred embodiment of the first device according to the present invention, said merging unit preferably comprises:

a bit pattern determination unit to generate different possible channel bits by determining different currently converted n-bit data symbols, and a selection unit that selects that currently converted n-bit data symbol that generate the lowest digital sum value and/or an equally distributed spectral distribution of the channel bits.

In a first alternative of a second preferred embodiment of the second method according to the present invention preferably the following steps are included:

converting a next to be processed m-bit data symbol of the digital binary data into a predetermined number of different n-bit data symbols, where m and n are positive integers and m<n, according to an encoding scheme used for producing a digital versatile disc, adding a random or pseudo random number to each of the respective n-bit data symbols to obtain influenced n-bit data symbols, determining a respective digital sum value and/or a respective spectral distribution of the channel bits for every possibility for appending a respective one of said influenced n-bit data symbols to previously selected n-bit data symbols, and choosing the n-bit data symbol to generate the channel bits which corresponding influenced n-bit data symbol generate the lowest digital sum value and/or an equally distributed spectral distribution of the channel bits.

Correspondingly, in a first alternative of a second preferred embodiment of the second device according to the present invention, said merging unit preferably comprises:

an adding unit for adding a random or pseudo random number to each of the respective n-bit data symbols to obtain influenced n-bit data symbols, a second determining unit for determining a respective digital sum value and/or a respective spectral distribution of the channel bits for every possibility for appending a respective one of said influenced n-bit data symbols to previously selected n-bit data symbols, and a selection unit for choosing the n-bit data symbol to generate the channel bits which corresponding influenced n-bit data symbol generate the lowest digital sum value and/or an equally distributed spectral distribution of the channel bits.

In a second alternative of a second preferred embodiment of the second method according to the present invention preferably the following steps are included:

converting a next to be processed m-bit data symbol of the digital binary data into a predetermined number of different n-bit data symbols, where m and n are positive integers and m<n, according to an encoding scheme used for producing a digital versatile disc, determining a respective digital sum value for every possibility for appending a respective one of said n-bit data symbols to previously selected n-bit data symbols, adding a random or pseudo random number to each of the respective digital sum values to obtain influenced digital sum values, and choosing the n-bit data symbol to generate the channel bits that generates the lowest influenced digital sum value and/or an equally distributed spectral distribution of the channel bits.

Correspondingly, in a second alternative of a second preferred embodiment of the second device according to the present invention, said merging unit preferably comprises:

a second determining unit for determining a respective digital sum value for every possibility for appending a respective one of said n-bit data symbols to previously selected n-bit data symbols, an adding unit for adding a random or pseudo random number to every respective digital sum value to obtain respective influenced digital sum values, and a selection unit for choosing the n-bit data symbol to generate the channel bits that generates the lowest influenced digital sum value and/or an equally distributed spectral distribution of the channel bits.

This second preferred embodiment according to the present invention is directed to the DVD format and formats derived therefrom, i.e. formats in that the channel bits are generated by respectively encoding m-bit data symbols into n-bit data symbols on basis of a state that is defined by the previously encoded m-bit data symbol to generate the channel bits. Further, two different "modulated channel bitstreams" are generated and memorized until one of the two modulated channel bitstreams is selected. According to the DVD format as defined e.g. in the Ecma-267 standard, each symbol of 8 data bits is mapped onto 16 channel bits, i.e. EFM+. The information is contained in the positions of the transitions, i.e. the modulated signal that drives the writing laser swaps its level from high to low or vice versa after each "1" within the code. According to the above referenced standard the code is generated in such a way that the minimum distance between 2 transitions is 3 channel bits and the maximum run length within the blocks is 11 channel bits. This rule is also referred to as run length limited (RLL) 2/10 code, i.e. (2, 10)-RLL, defining that the lowest number of consecutive "0" within the code is 2 and the maximum number of consecutive "0" within the code is 10. According to the present invention, however, this maximum number might be set to be higher in a predetermined pattern or in at least one predetermined position on said recording medium. Further, according to the above referenced standard the code is generated in such a way that always that next n-bit data symbol and/or the channel bitstream is selected that generates the lowest DSV (either on a short term or on a long term "look ahead" basis). According to the present invention, however, the decision is influenced on basis of a random noise so that a wanted deviation from the generation of the lowest DSV occurs.

Therefore, in the second preferred embodiment of the methods according to the present invention, preferably m=8, d=3 and n=16. Further, in the second preferred embodiment of the first method according to the present invention, preferably k>11. Further preferably 11<k<19.

The first and second methods and devices according to the present invention might advantageously be combined in any desired way to enhance their respective effect.

In the methods according to the present invention, a m-bit data symbol might be chosen as belonging to said predetermined pattern or said at least one predetermined position on said recording medium in case its corresponding channel bits that would result from a generation with a maximum run length k=11 would show a digital sum value that lies above the digital sum value that would result from a generation with k>11. With this advantageous selection of n-bit data symbols the first copy protection scheme as set out above might be realized according to the present invention, since therewith the original recorded with the modulation according to the present invention definitively shows a run length k>11 that can not be generated according to the standard modulation that is performed during a copying of the original recording medium.

Further, in the methods according to the present invention, a m-bit data symbol might be chosen as belonging to said predetermined pattern or said at least one predetermined position on said recording medium in case it lies in said predetermined pattern or said at least one predetermined position on said recording medium. With this advantageous selection of n-bit data symbols also the first copy protection scheme as set out above might be realized according to the present invention, in particular it is possible to implement a copy protection key or fingerprint in this manner.

Still further, in the methods according to the present invention, consecutive m-bit data symbols might be chosen as belonging to at least a part of said predetermined pattern or said at least one predetermined position on said recording medium in case they show a predetermined repetitive bit pattern, in particular resulting in a characteristic spectral distribution of the resulting channel bits as set out above, at least after a predetermined repetition of the bit pattern. With this advantageous selection of n-bit data symbols the second copy protection scheme as set out above might be realized according to the present invention.

Therefore, a method to produce a copy protected recording medium for digital data according to the present invention comprises the steps of:
- determining at least one predetermined repetitive bit pattern which normally, i.e. according to the standard for the recording medium, modulates into channel bits having a spectral distribution that shows at least one range of frequencies with a characteristic amplitude distribution,
- replacing at least one part of the digital data to be recorded by the at least one predetermined repetitive bit pattern and/or inserting the at least one predetermined repetitive bit pattern into at least one part of the digital data to be recorded, and
- transferring said digital data including the at least one replaced and/or inserted part onto said recording medium with a modulation that generates corresponding channel bits having a spectral distribution that does not show the characteristic amplitude distribution in said at least one range of frequencies.

Preferably, in the method to produce a copy protected recording medium for digital data according to the present invention said at least one range of frequencies with said characteristic amplitude distribution ensures that a reading process will be aborted or disturbed in the area of the predetermined repetitive bit pattern and said corresponding channel bits having a spectral distribution that does not show the characteristic amplitude distribution in said at least one range of frequencies ensure that a reading process will not be disturbed by the predetermined repetitive bit pattern.

Alternatively or additionally preferably, in the method to produce a copy protected recording medium for digital data according to the present invention said characteristic amplitude distribution shows a more frequent and/or more rapid change of amplitude and/or a significant higher amplitude than an average amplitude of the spectral distribution of the channel bits on the recording medium or at least one predetermined part thereof and/or a significant bigger area underneath the amplitude curve in comparison to the amplitude curve of the corresponding channel bits having a spectral distribution that does not show the characteristic amplitude distribution in said at least one range of frequencies, in particular in the frequency area from 0 to 15000 Hz.

Further alternatively or additionally preferably, in the method to produce a copy protected recording medium for digital data according to the present invention said predetermined repetitive bit pattern is selected so that according to the standard modulation merge bits are predefined and therefore not changeable by the recording electronic of a recorder due to design rules of the digital data content of the recording medium.

Still further alternatively or additionally preferably, in the method to produce a copy protected recording medium for digital data according to the present invention said recording comprises a modulation according to the present invention as set out above. Of course, this modulation according to the present invention is not only suited for recording repetitive bit patterns that result in a characteristic spectral distribution of the resulting channel bits as set out above, but is also suited for recording repetitive bit patterns that generate a high DSV, so that reading devices can properly access the recording media on which such bit patterns are recorded. Therefore, the modulation according to the present invention as such is also applicable to copy protection schemes that work on a "high DSV basis".

Correspondingly, the device to produce a copy protected recording medium for digital data according to the present invention comprises:
- a first unit for replacing at least one part of the digital data to be recorded by at least one predetermined repetitive bit pattern and/or for inserting at least one predetermined repetitive bit pattern into at least one part of the digital data to be recorded, wherein said repetitive bit pattern normally, i.e. according to the standard for the recording medium, modulates into channel bits having a spectral distribution that shows at least one range of frequencies with a characteristic amplitude distribution, and
- a second unit for transferring said digital data including the at least one replaced and/or inserted part to a recording medium production unit which produces said recording medium with a modulation that generates corresponding channel bits having a spectral distribution that does not show the characteristic amplitude distribution in said at least one range of frequencies.

Preferably, said recording medium production unit comprises a device for modulating digital binary data as set out above.

The first method for verifying a recording medium according to the present invention comprises the step of: determining whether or not a maximum run length of the channel bits recorded in a predetermined pattern or at least one predetermined position on said recording medium exceeds a maximum run length as defined in the standard of said recording medium.

The second method for verifying a recording medium according to the present invention comprises the step of: determining whether or not the merging decision of channel bits recorded in a predetermined pattern or at least one predetermined position on said recording medium is influenced on basis of a random noise.

The third method for verifying a recording medium according to the present invention comprises the step of: determining whether or not at least one part on said recording medium comprises channel bits having a spectral distribution that shows a characteristic amplitude distribution in at least one range of frequencies.

In this third method for verifying a recording medium according to the present invention, preferably said characteristic amplitude distribution shows a more frequent and/or more rapid change of amplitude and/or a significant higher amplitude than the average amplitude of the spectral distribution of the channel bits on the recording medium or at least one predetermined part thereof and/or a significant bigger area underneath the amplitude curve in comparison to the amplitude curve of the corresponding channel bits having a spectral distribution that does not show the characteristic amplitude distribution in said at least one range of frequencies, in particular in the frequency area from 0 to 15000 Hz.

The verification step might be performed directly as described or indirectly e.g. by evaluating access times and/or error rates.

These verification methods are directed to the first copy protection scheme as set out above and use the feature of the presence or absence of a deviation from the standard as a key to access the recording medium. Such a verification method might not be absolutely necessary according to the second copy protection scheme, since a copy of a recording medium secured therewith is not accessible or only accessible in a disturbed manner. However, e.g. in case the bit patterns that generate the characteristic spectral distribution of the resulting channel bits are removed during the copy process, with the verification method a doubled security is possible by just including one security measure onto the recording medium, e.g. the predetermined repetitive bit patterns, and the modulation according to the present invention that ensures accessibility of the original.

Correspondingly, the first device for verifying a recording medium according to the present invention comprises: an evaluation unit for determining whether or not a maximum run length of the channel bits recorded in a predetermined pattern or at least one predetermined position on said recording medium exceeds a maximum run length as defined in the standard of said recording medium. The device is preferably built into the reading device, further preferably included in the controller chip of the reading device.

Also correspondingly, the second device for verifying a recording medium according to the present invention comprises: an evaluation unit for determining whether or not the merging decision of channel bits recorded in a predetermined pattern or at least one predetermined position on said recording medium is influenced on basis of a random noise.

Also correspondingly, the third device for verifying a recording medium according to the present invention comprises: an evaluation unit for determining whether or not at least one part on said recording medium comprises channel bits having a spectral distribution that shows a characteristic amplitude distribution in at least one range of frequencies.

Each device for verifying a recording medium according to the present invention evaluates the channel bits, or alternatively or additionally directly the reading signal, i.e. the length of the reflection in respect to the time base, to detect the deviation from the standard, in particular the maximum run length, e.g. for a recording based on the CD standard including the merging bits. Such an evaluation is not performed in state of the art reading devices. Therefore, the verifying devices according to the present invention are in particular suited for a dedicated platform, e.g. in future game consoles.

Of course, the methods and devices for verifying a recording medium according to the present invention might be combined in any desired manner.

The first method for copying digital binary data recorded on an original recording medium onto a recordable recording medium according to the present invention comprises the steps of: evaluating whether or not a maximum run length of the channel bits recorded in a predetermined pattern or at least one predetermined position on said original recording medium exceeds a maximum run length as defined in the standard of said recording medium, and generating a corresponding exceeding maximum run length of the channel bits to be recorded in a corresponding predetermined pattern or at least one corresponding predetermined position on said recordable recording medium.

The second method for copying digital binary data recorded on an original recording medium onto a recordable recording medium according to the present invention comprises the steps of: evaluating whether or not the merging decision of channel bits recorded in a predetermined pattern or at least one predetermined position on said recording medium is influenced on basis of a random noise, and generating channel bits to be recorded in a corresponding predetermined pattern or at least one corresponding predetermined position on said recordable recording medium in which the merging decision is influenced on basis of a random noise.

The third method for copying digital binary data recorded on an original recording medium onto a recordable recording medium according to the present invention comprises the steps of:

searching for at least one part of digital data to be copied onto said recordable recording medium comprising at least one predetermined repetitive bit pattern which would normally, i.e. according to the standard for the recording medium, modulate into channel bits having a spectral distribution that shows at least one range of frequencies with a characteristic amplitude distribution, and replacing said at least one part by a bit pattern which modulates into channel bits having a spectral distribution that does not show the characteristic amplitude distribution in said at least one range of frequencies, or for deleting said at least one part, or modulating said at least one part into channel bits having a spectral distribution that does not show the characteristic amplitude distribution in said at least one range of frequencies.

In the third method for copying digital binary data recorded on an original recording medium onto a recordable recording medium according to the present invention, preferably said characteristic amplitude distribution shows a more frequent and/or more rapid change of amplitude and/or a significant higher amplitude than the average amplitude of the spectral distribution of the channel bits on the recording medium or at least one predetermined part thereof and/or a significant bigger area underneath the amplitude curve in comparison to the amplitude curve of the corresponding channel bits having a spectral distribution that does not show the characteristic amplitude distribution in said at least one range of frequencies, in particular in the frequency area from 0 to 15000 Hz.

Correspondingly, a first device for copying digital binary data recorded on an original recording medium onto a recordable recording medium according to the present invention comprises:

a searching unit for evaluating whether or not a maximum run length of the channel bits recorded in a predetermined pattern or at least one predetermined position on said original recording medium exceeds a maximum run length as defined in the standard of said recording medium, and a generator for generating a corresponding exceeding maximum run length of the channel bits to be recorded in a corresponding predetermined pattern or at least one corresponding predetermined position on said recordable recording medium.

Also correspondingly, a second device for copying digital binary data recorded on an original recording medium onto a recordable recording medium according to the present invention comprises:

a searching unit for evaluating whether or not the merging decision of channel bits recorded in a predetermined pattern or at least one predetermined position on said recording medium is influenced on basis of a random noise, and a generator for generating channel bits to be recorded in a corresponding predetermined pattern or at least one corresponding predetermined position on said recordable recording medium in which the merging decision is influenced on basis of a random noise.

Also correspondingly, a third device for copying digital binary data recorded on an original recording medium onto a recordable recording medium according to the present invention comprises:

a searching unit for searching for at least one part of digital data to be copied onto said recordable recording medium comprising at least one predetermined repetitive bit pattern which would normally, i.e. according to the standard for the recording medium, modulate into channel bits having a spectral distribution that shows at least one range of frequencies with a characteristic amplitude distribution, and a generator for replacing said at least one part by a bit pattern which modulates into channel bits having a spectral distribution that does not show the characteristic amplitude distribution in said at least one range of frequencies, or for deleting said at least one part, or for modulating said at least one part into channel bits having a spectral distribution that does not show the characteristic amplitude distribution in said at least one range of frequencies.

A computer program product according to the present invention comprises computer program means adapted to perform the method steps as defined above when being executed on a computer, digital signal processor, or the like.

A computer storage means according to the present invention comprises a computer program product according to the above paragraph.

In the recording medium according to the present invention at least a part of the recorded channel bits corresponding to the recorded digital binary data deviate from a standard for the recording medium in that they show a maximum run length larger than that defined in the standard and/or the merging decision is influenced on basis of a random noise and/or by comprising at least one part comprising at least one predetermined repetitive bit pattern which normally, i.e. according to the standard for the recording medium, encodes into channel bits having a spectral distribution that shows at least one range of frequencies with a characteristic amplitude distribution.

Preferably, said deviating channel bits are comprised in a predetermined pattern or in at least one predetermined position.

Alternatively or additionally preferably, said deviating channel bits result from a modulation of at least one predetermined repetitive bit pattern as set out above, which predetermined repetitive bit pattern would modulate according to the standard of the recording medium into channel bits having an accumulated digital sum value that exceeds a first predetermined limit.

The equalized spectral distribution mentioned above is not intended to achieve a total equalization of all amplitudes of the spectrum of the resulting channel bits, but to achieve a certain flattening of the spectral distribution so that reading devices will not have problems in reading the data that would according to a standard encoding result in a disturbed accessibility or in a non-accessibility of the recording medium.

The recording medium according to the present invention is preferably an optical record carrier, e.g. a CD or CD like record carrier, or a DVD or DVD like record carrier.

The advantage of a copy protection with the modulation according to the present invention is the not restricted accessibility of an original recording medium or record carrier, since the introduced deviation from the standard has in fact no effect on reading devices, since the reading operation itself is generally not disturbed when k is varied not too much in respect to the used standard or when the merging decision is slightly influenced based on random noise. Reading devices may also use the minimum distance between two transitions for synchronization of the spin of the recording device and for clock generation. However, this minimum distance is not varied according to the present invention. Further, the decoding operation is not disturbed, since according to the present invention every single m-bit data symbol is encoded according to the standard into a corresponding n-bit data symbol that can therefore be decoded to the standard into the original m-bit data symbol. In case of a CD decoding the merging bits that introduce the maximum run length violation according to the present invention are removed before the actual decoding takes place, and in case of a DVD decoding each respective n-bit data symbol can be properly decoded due to the fact that the maximum run length violation introduced according to the present invention is only present over two n-bit data symbols, but not within one thereof. Also, the influence of the merging decision according to the present invention has no effect on single data symbols, but only on their combination.

However, since this deviation from the standard is not performed when copying the digital binary data from the recording medium recorded according to the present invention with standard recorder onto a recording medium, e.g. on basis of a mastering process, or with a recording medium burning device onto a recordable recording medium, the (original) recording medium according to the present invention and the copy are distinguishable. Further, in case the recording medium according to the present invention further comprises digital binary data that would according to the standard modulate into channel bits showing a characteristic spectral distribution as set out above, the copy thereof would most likely not be accessible by a reading device, while the recording medium according to the present invention itself can be accessed without any problems, since the modulation according to the present invention deviates from the standard so that no such characteristic spectral distribution as set out above will be generated, i.e. in that respect no reading problems are caused.

Therewith, the concept underlying the second copy protection scheme according to the present invention is to include digital data on a recording medium that leads to an inaccessibility of a disc when being recorded according to the standard for that disc, but to record the disc according to the present invention and therewith assure accessibility by any reading device. This inaccessibility is e.g. achieved by including a predetermined repetitive bit pattern in the data, which bit repetitive pattern leads to a spectral distribution of the resulting channel bits that confuses the reading device, since e.g. merge bits are predefined and therefore not changeable by the recording electronic of a recorder due to design rules of the digital data content of the record carrier when the standard should be fulfilled, i.e. then only predetermined merge bits can be inserted due to the bit pattern and the rules to generate the channel bits. This case includes that the merge bits might be selected from the recording electronic of the standard recorder from a group of predefined merge bits which all fulfil the requirements according to the standard, i.e. which all lead to the desired effect, even if the recording electronic selects those merge bits which result in the lowest possible effect. Such a group of predefined merge bits might be 100, 010, 001 which all have the same effect that the status of the following bits gets inverted, but the position of the inversion is changed. Due to this "variable" position also the generated frequency of the resulting channel bits is variable within certain limits. In general the recording electronic of the standard recorder will select those merge bits which will lead to the lowest digital sum value, which, however, can be chosen on basis of the predetermined repetitive bit pattern to fulfil the requirements according to the present invention.

In this specification the term channel bits is used for the bit pattern that generally satisfies the various constraints for digital data as an asynchronous signal, such as a trade-off between recording density and error rate, the highest permissible transition frequency, self-clocking, the NonReturn to Zero Inverted (NRZI) format which has a run length limited (RLL) code, e.g. for compact discs usually the (2,10)-RLL, that is according to the present invention modified in respect to the standard used for the type of recording medium, an requirement for a limit on the low frequency content of the read signal, and so on.

According to the present invention advantage is taken from the effect that normal usually used writing devices work according to the standard and therefore keep the (2,i)-RLL, with e.g. i=10 for CD and for DVD, for a produced target recording medium also when the corresponding source recording medium uses a (2, i+x)-RLL with x being a positive integer. The present invention further takes advantage from the effect that such normal usually used writing devices perform the merging according to a standard for a produced target recording medium also when the corresponding merging of the source recording medium deviates from that standard. Since these deviations from the standard are not recognized by more or less all reading devices, the recording media according to the present invention which are produced on basis of a modified modulation scheme can be accessed without failure, but copies thereof can be distinguished from originals, or copies thereof e.g. obtained by recording on a corresponding recordable recording medium cannot be properly accessed due to specially included data.

According to the present invention this specially included data is preferably a repetitive bit pattern selected according to the spectrum of the resulting channel bits, in particular so that an amplitude of a certain frequency or frequency range is unusual high in comparison to an amplitude of said certain frequency or frequency range that does not lead to problems of the reading device.

Figure 2:
Figure 2:
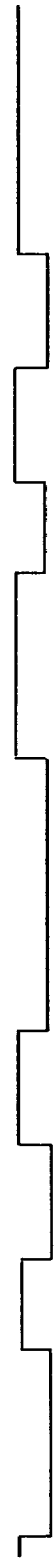
Figure 3:
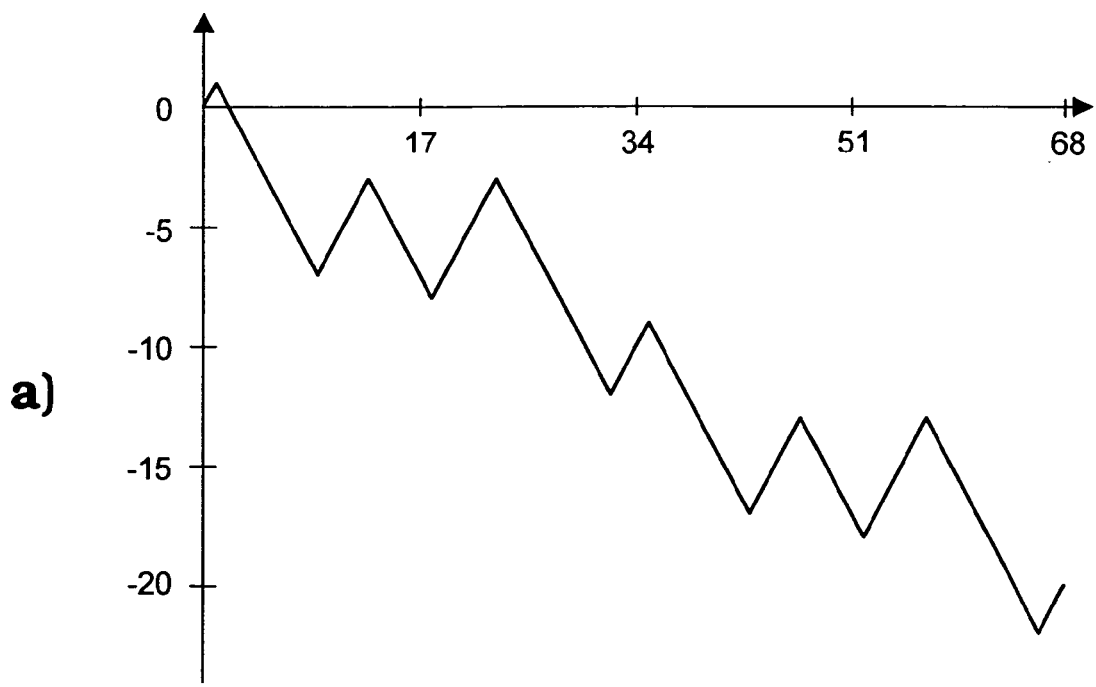
Figure 3:
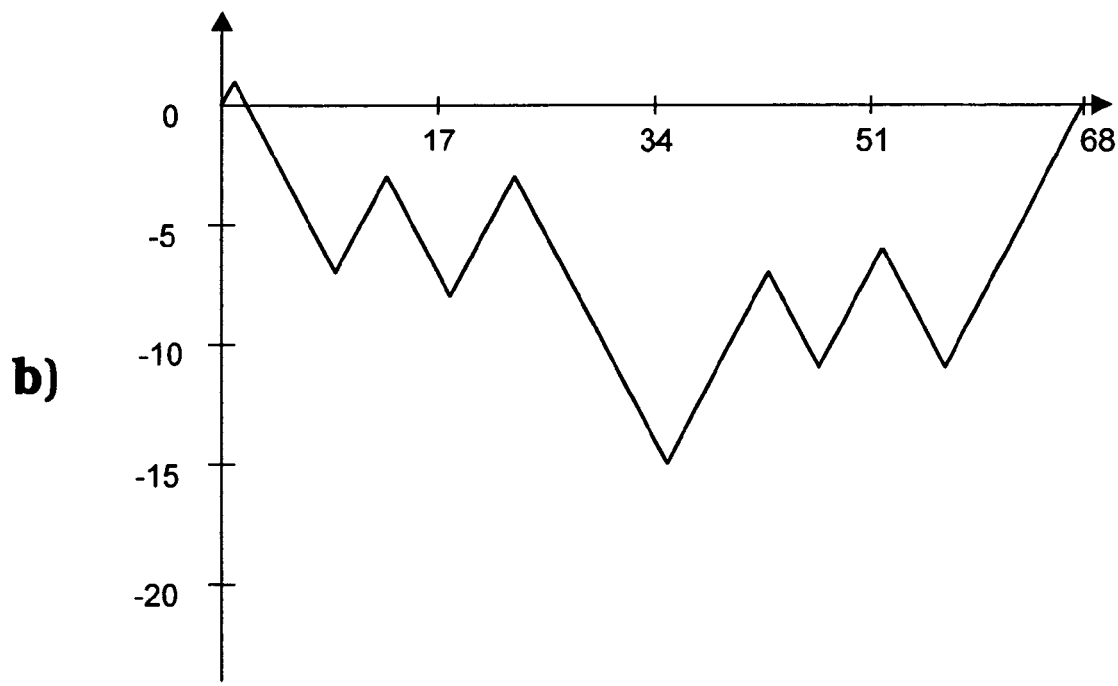
Figure 4:
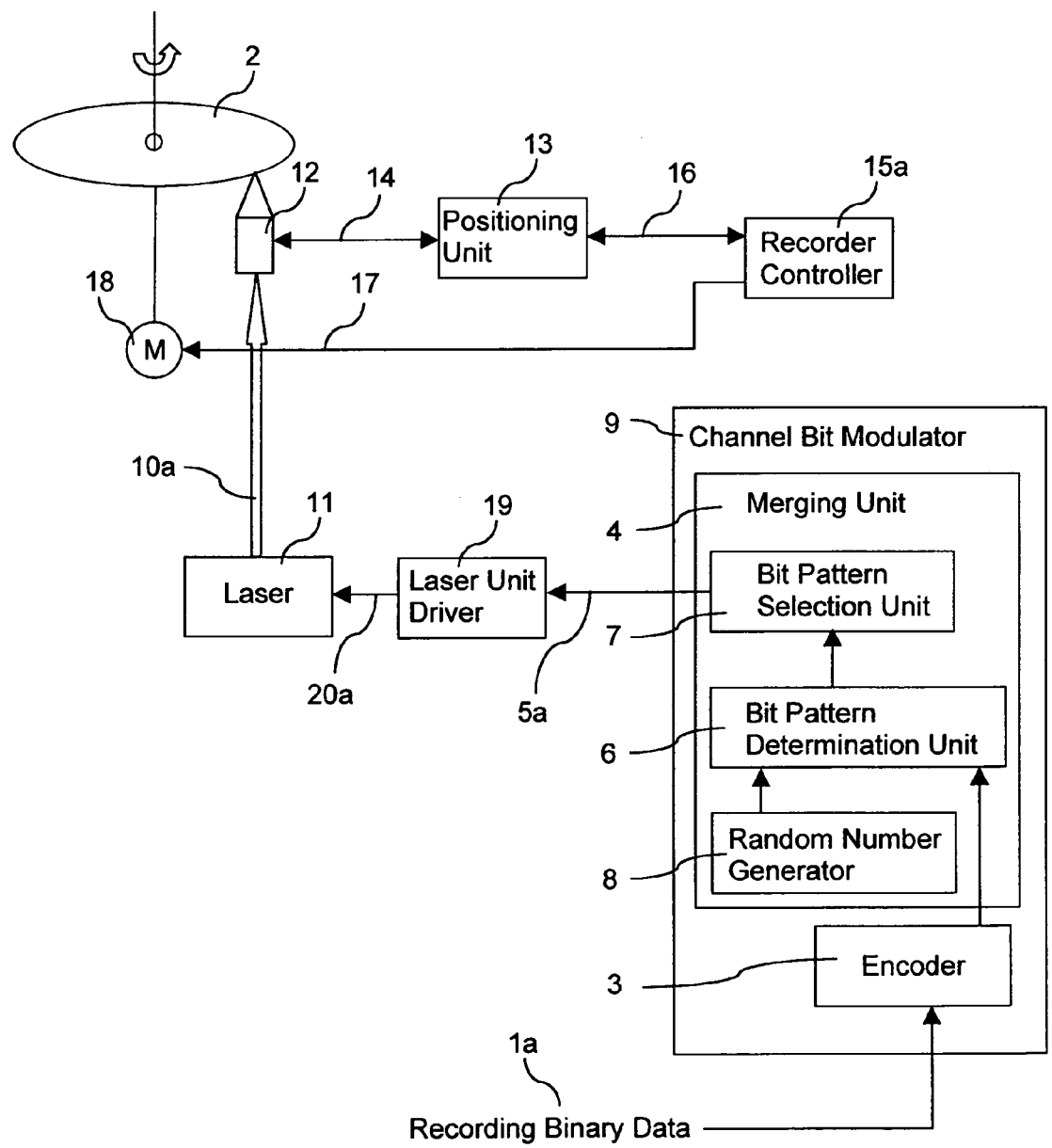
Figure 5:
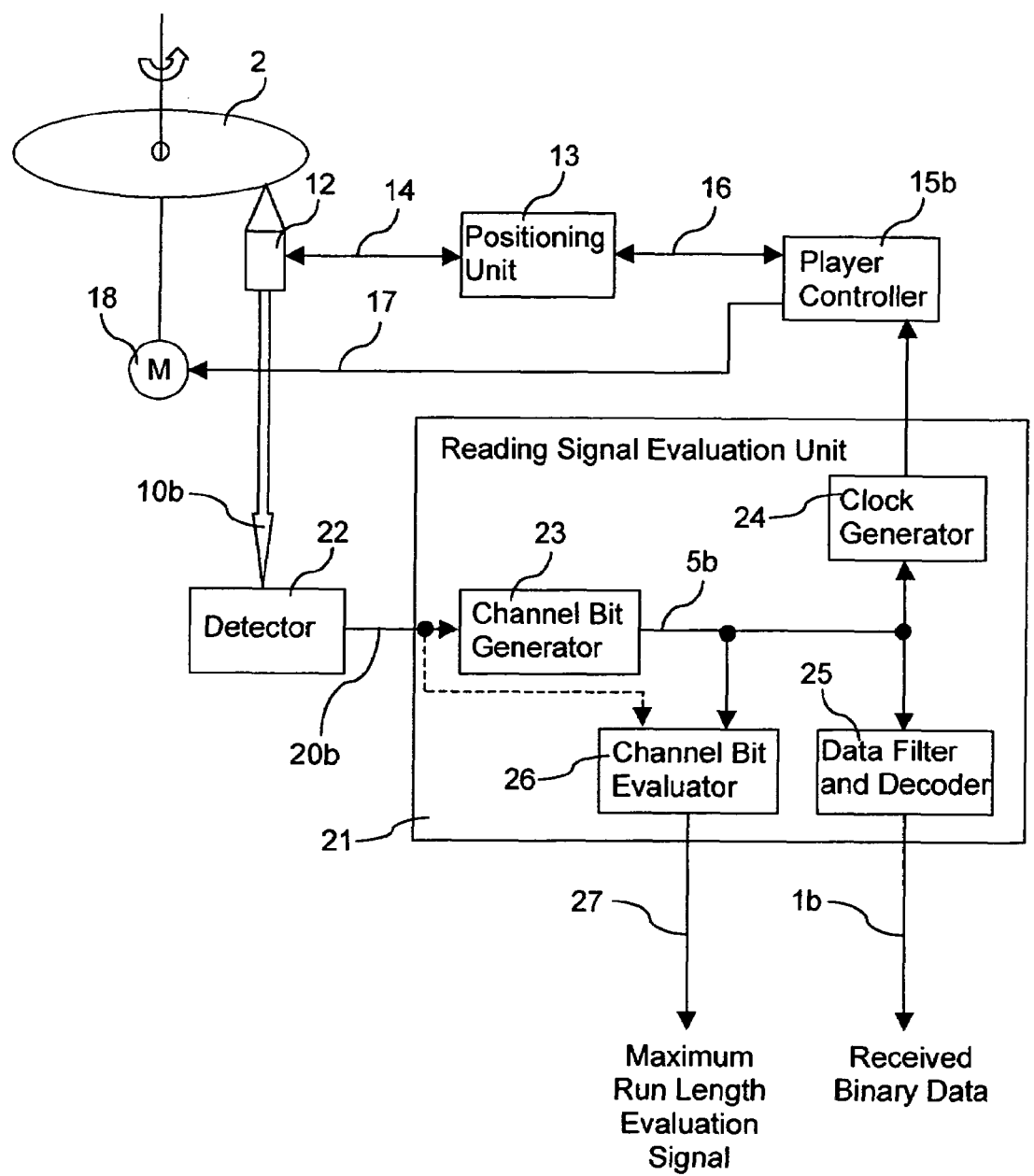

The accompanying drawings, which are incorporated in and constitute a part of this specification, illustrate embodiments of the invention and, together with a general description of the invention given above, and the detailed description of the embodiments given below, serve to explain the principles of the invention, wherein:

FIG. 1 shows a CD frame comprising 588 channel bits,
FIG. 2 illustrates two cycles of channel bits encoding a repetitive bit pattern according to the standard modulation, and channel bits generated from the same binary data according to the modulation of the present invention,
FIG. 3 illustrates the DSV curves for each of the channel bit streams shown in FIG. 2 and the spectral distribution of approximately 10000 repetitions of the channel bits shown in FIG. 2,
FIG. 4 shows a recording medium recorder comprising a modulation unit according to the present invention, and
FIG. 5 shows a recording medium reading device comprising a verification device according to the present invention.

The following description shows as an example how to modify the physical data stream of an audio CD to prevent copying the audio CD on a CD-R while simultaneously providing improved accessibility of the original recording medium on basis of the modulation of the binary data to be recorded according to the present invention. The format of the physical data stream is generally specified in the 'Red Book' and the 'Yellow Book' specifications. Generally, the same concept might be applied to a DVD recording. The necessary alterations of the described embodiments are outlined in the example.

As indicated above, the physical data stream on a CD is optimized in multiple ways to reduce errors and guarantee a simple decoding mechanism. Therefore the Red Book standard specifies that every 3 to 11 bits must be a transition of the signal. Within the data symbols this is guaranteed by the EFM (Eight-to-Fourteen Modulation). The audio data is split into 8 bit symbols that are converted to a 14-bit symbol with the EFM table. This table consist of 256 entries of 14 bit values that are combinations of bits that contain more than 2 but less than 10 zeros continuously. Every '1' in the 14-bit symbol represents a transition of the signal. To also guarantee this restriction when symbols are concatenated there are additional 3 bits of merging, which must be chosen accordingly. On a CD these transitions can be seen in form of pits and lands. The length of each is bounded between 3 and 11 times the base length.

The final frame of audio data, i.e. a CD Raw sector, contains the following data:

| | |
|---|---|
| 1 synchronization symbol | 24 bits |
| 1 subcode byte | 14 bits (EFM encoded) |
| 24 data bytes | 336 bits (EFM encoded) |
| 8 parity bytes | 112 bits (EFM encoded) |
| 34 * 3 merging bits | 102 bits |
| TOTAL | 588 bits |

These bits, i.e. channel bits, which fulfil the various constraints of the digital recording as indicated above, are composed in the way as shown in FIG. 1. The order of one CD frame is as follows: the synchronization pattern of 24 bits is followed by 3 auxiliary bits for merging and low frequency suppression; thereafter 14 bits subcode data are followed by 3 auxiliary bits for merging and low frequency suppression;

thereafter 12 blocks of 14 bits information data are respectively followed by 3 auxiliary bits for merging and low frequency suppression; thereafter 4 blocks of 14 bits parity data are respectively followed by 3 auxiliary bits for merging and low frequency suppression; thereafter 12 blocks of 14 bits information data are respectively followed by 3 auxiliary bits for merging and low frequency suppression; and finally 4 blocks of 14 bits parity data are respectively followed by 3 auxiliary bits for merging and low frequency suppression.

As mentioned above, a repetitive bit pattern is inserted into the data stream (which can be audio samples or digital data), or predetermined data, e.g. in case of audio such audio samples corresponding to silence, is replaced by the predetermined bit pattern to ensure that the reading process of a copy of the mastered record carrier including said repetitive predetermined bit pattern will be aborted or disturbed, as it is e.g. described in the applicants earlier European patent application EP 02 008 668.2 "Copy Protection System for Optical Discs", which content is included by reference into this specification. As described therein, this is achieved by securing that the predetermined repetitive bit pattern effects a generation of a pit and land pattern on the record carrier which is not equally distributed, i.e. which shows either more pit parts than land parts or more land parts than pit parts. This is basically achieved by choosing values for the replaced or inserted "audio or data samples" which result after the EFM in a predetermined bit pattern which preferably fulfils the requirement that only predetermined merging bits can be inserted between the bits corresponding to the audio samples due to the (2,10)-RLL requirement for normally ensuring no mismatch of pit parts and land parts, but is used to ensure the mismatch of pit parts and land parts here.

However, since this rule of not equally distributed pit parts and land parts does not always result in the desired effect, according to the present invention the rule of selecting a bit pattern that leads to a "disturbing" characteristic spectrum of the resulting channel bits is given, i.e. to select the bit pattern so that predetermined frequencies or frequency ranges show a high amplitude so that a reading device accessing the recording medium will abort the access or at least have a disturbed access.

In the following an example of such replaced or inserted "audio sample values" will be given in reference to FIGS. 2 and 3.

As inserted "audio sample" values which are inserted or which replace at least one part of the digital data to be recorded, i.e. audio samples of e.g. silence the hexadecimal values 70 and 01 are exemplary used. The combined value 7001h (h shows the hexadecimal notation) will be at least once repeated a predetermined amount of times so that at least one part of the record carrier recorded according to the standard comprises the characteristic spectrum of the resulting channel bits.

The value 70h corresponds to the bit pattern 01110000b (b shows the binary notation) and the value 01h corresponds to the bit pattern 00000001b. After the EFM, i.e. the encoding, the bit pattern 01110000b is converted into the bit pattern 10000000100010b and the bit pattern 00000001b is converted into the bit pattern 10000100000000b.

These both encoded bit patterns that are repeatedly generated have to be merged to perform the modulation thereof. Generally, inserting those 3 merging bits that generate the lowest DSV performs such a merging to generate a data stream of channel bits which might be seen as or determine a modulation signal for the recording. Therefore, first all possible merging bit patterns from the available 4 merging bit patterns "000", "001", "010", and "100" are determined based on the (2,10)-RLL requirement and thereafter the merging bit pattern of the determined ones that generates the lowest DSV is selected to be inserted. The DSV might be calculated based on the previous data and/or also by a "look ahead" procedure based on the next data, i.e. in general a predetermined number of next m-bit data symbols and/or corresponding n-bit data symbols.

FIG. 2a shows the channel bits resulting according to the standard. Due to the (2,10)-RLL requirement of the standard the three merging bits (the merging bits are underlined in FIG. 2) between the EFM bit pattern 10000000100010 and the EFM bit pattern 10000100000000 can only be selected to 000 and the three merging bits between the EFM bit pattern 10000100000000 and the EFM bit pattern 10000000100010 can only be selected to 100.

The resulting channel bits for these two repetitive successively following audio samples result in a bit stream as indicated in the bottom of FIG. 2a which have a distribution corresponding to 22 bits low (pit or land) and 12 bits high (land or pit), i.e. 22:12 instead of the ideal distribution of 17:17.

FIG. 3a shows the resulting DSV for channel bits corresponding to the repetitive bit pattern $7001h$ according to the standard under the assumption that it is 0 at the beginning. After the first channel bit the DSV is 1, then it decreases linear to −7 after the $9^{th}$ channel bit, increases linear to −3 after the $13^{th}$ channel bit, decreases linear to −8 after the $18^{th}$ channel bit, increases linear to −3 after the $23^{rd}$ channel bit, decreases linear to −12 after the $32^{nd}$ channel bit, increases linear to −9 after the $35^{th}$ channel bit, decreases linear to −17 after the $43^{rd}$ channel bit, increases linear to −13 after the $47^{th}$ channel bit, decreases linear to −18 after the $52^{nd}$ channel bit, increases linear to −13 after the $57^{th}$ channel bit, decreases linear to −22 after the $66^{th}$ channel bit, and finally increases linear to −20 after the $68^{th}$ channel bit. This increase and decrease behaviour will be repeated as long as the digital data 7001h will be repeated, but starting from the respective last value of the DSV, i.e. for the channel bits that would follow the shown ones with the last DSV of −20.

Figure 3C:
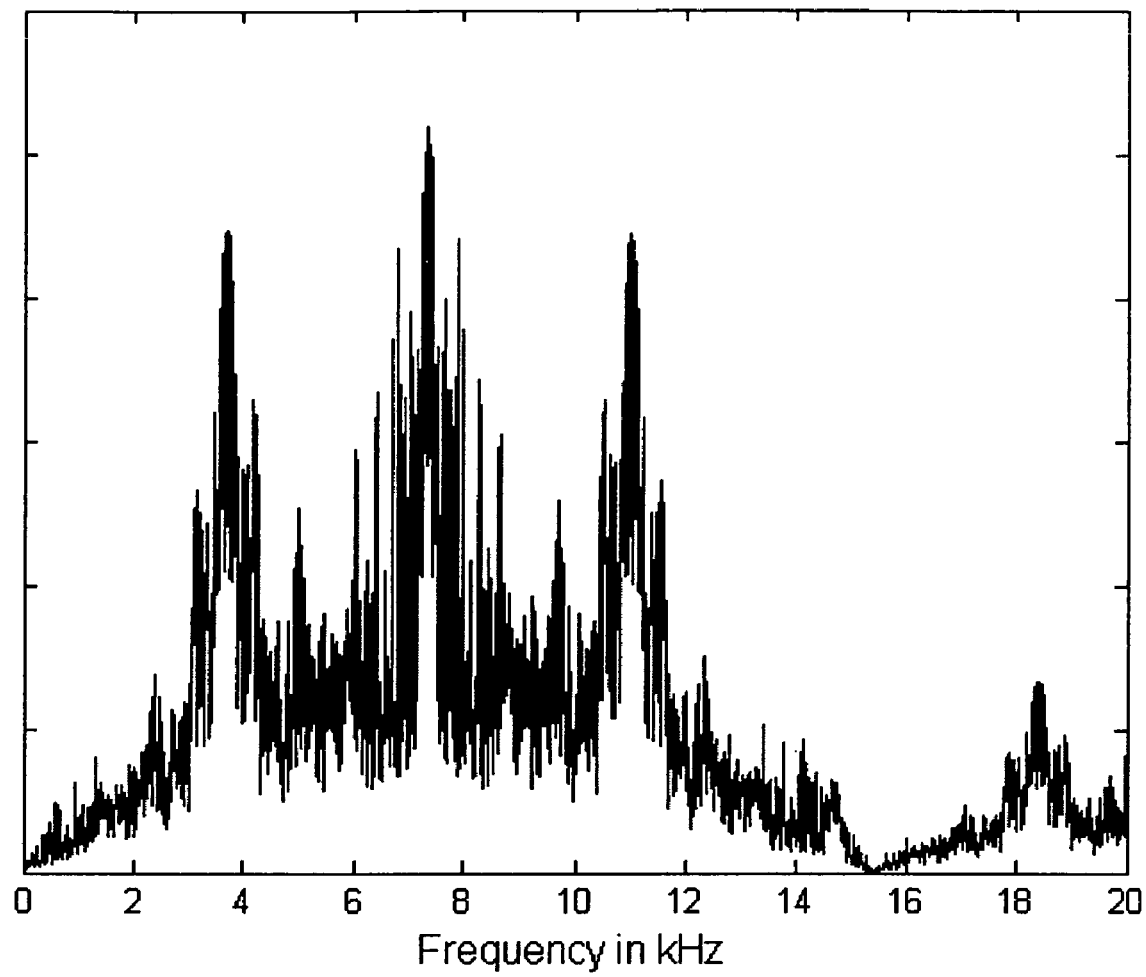

Further, FIG. 3c shows the spectrum of approximately 10000 repetitions of the pattern 7001h with a merging according to the standard. It can clearly be seen that the frequency ranges around 3675 Hz, around 7350 Hz, and around 11025 Hz have very high amplitudes in comparison to the amplitudes of other frequencies. If the repetition is long enough and therewith the amplitudes of these frequency ranges steadily increase, it can be secured that many reading devices will have problems to properly access the recording medium, e.g. because resonance is generated in the reading devices.

FIG. 2b in turn shows the channel bits resulting according to one embodiment of the present invention. Due to the changing of the (2, 10)-RLL requirement of the standard to a (2,10+x)-RLL requirement according to the present invention the three merging bits (the merging bits are underlined in FIG. 2) between the EFM bit pattern 10000000100010 and the EFM bit pattern 10000100000000 can also only be selected to 000, but the three merging bits between the EFM bit pattern 10000100000000 and the EFM bit pattern 10000000100010 can be selected to 100 or 000. In this particular case a (2, 11)-RLL requirement would be met.

The first possibility, i.e. a selection of 100 between the EFM bit pattern 10000100000000 and the EFM bit pattern 10000000100010, results in the example shown and described in connection with FIG. 2a. The resulting channel bits for these two repetitive successively following audio samples according to the second possibility, i.e. a selection of 000 between the EFM bit pattern 10000100000000 and the EFM bit pattern 10000000100010, results in a bit stream as indicated in the bottom of FIG. 2b which have a distribution corresponding to 24 bits low (pit or land) and 10 bits high (land or pit), i.e. 24:10 instead of the ideal distribution of 17:17 in every second bit pattern corresponding to 7001h and an inverted distribution in every other second bit pattern corresponding to 7001h, i.e. a distribution corresponding to 10 bits low (pit or land) and 24 bits high (land or pit), i.e. 10:24 instead of the ideal distribution of 17:17. Therefore, the total DSV over an equal number of following channel bits corresponding to 7001h is 0 and over an odd number of following channel bits corresponding to 7001h is either +14 or −14.

FIG. 3b shows the resulting DSV for channel bits corresponding to the repetitive bit pattern 7001h according to the present invention under the assumption that it is 0 at the beginning. After the first channel bit the DSV is 1, then it decreases linear to −7 after the $9^{th}$ channel bit, increases linear to −3 after the $13^{th}$ channel bit, decreases linear to −8 after the $18^{th}$ channel bit, increases linear to −3 after the $23^{rd}$ channel bit, decreases linear to −15 after the $35^{th}$ channel bit, increases linear to −7 after the $43^{rd}$ channel bit, decreases linear to −11 after the $47^{th}$ channel bit, increases linear to −6 after the $52^{nd}$ channel bit, decreases linear to −11 after the $57^{th}$ channel bit, and finally increases linear to 0 after the $68^{th}$ channel bit. Since this increase and decrease behaviour will be repeated as long as the digital data 7001h will be repeated and always a starting from the respective last value of the DSV is performed, in this case a maximum negative DSV of −14 will be obtained in case of an odd number of repeated 7001h values.

Figure 3D:
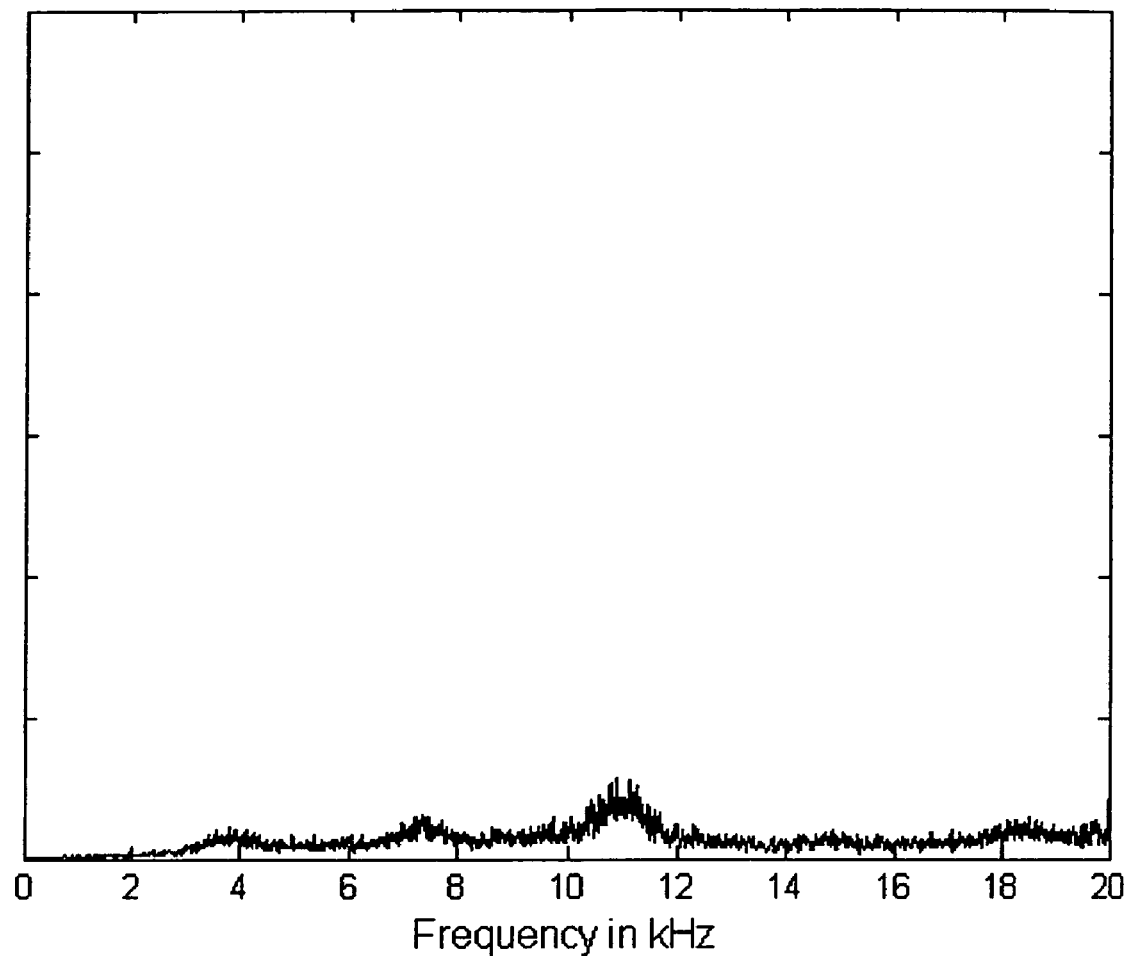

FIG. 3d shows the corresponding channel bit spectrum of approximately 10000 repetitions of the pattern 7001h with the merging according to the present invention that allows a larger maximum run length as described above and is influenced based on random noise as described below in detail. It can clearly be seen that the frequency ranges around 3675 Hz, around 7350 Hz, and around 11025 Hz have equalized amplitudes in comparison to the amplitudes generated according to the standard modulation shown in FIG. 3c. Even if the repetition is quite long, it can be secured that most reading devices will not have problems to properly access the recording medium, e.g. because no resonance is generated in the reading devices.

The comparison of FIG. 3c that shows the characteristic amplitude distribution, i.e. generated from the predetermined repetitive bit pattern with the standard modulation, and FIG. 3d that shows the amplitude distribution generated from the predetermined repetitive bit pattern with the modulation according to the invention so that the amplitude distribution is adapted to a 'normal' amplitude distribution, i.e. of average user data with the standard modulation, shows the typical differences of both amplitude distributions. It can be observed that said characteristic amplitude distribution shows a more frequent and more rapid change of amplitude and a significant higher amplitude, e.g. up to approximately 10 times higher, than the average amplitude of the spectral distribution of the channel bits on the recording medium or at least one predetermined part thereof as well as a significant bigger area underneath the amplitude curve in comparison to the amplitude curve of the corresponding channel bits having a spectral distribution that does not show the characteristic amplitude distribution in said at least one range of frequencies, in particular in the frequency area from 0 to 15000 Hz. The area of the characteristic amplitude distribution is in this case approximately 5 to 8 times bigger that obtained from the channel bits generated from the predetermined repetitive bit pattern with the modulation according to the present invention.

Therefore, based on the presence or absence of one or more of these characteristic features an original recording medium can be distinguished from a copy thereof, since the original will show an amplitude distribution of the spectrum of the channel bits corresponding to the predetermined repetitive bit pattern as shown in FIG. 3d and the copy will show an amplitude distribution of the spectrum of the channel bits corresponding to the predetermined repetitive bit pattern as shown in FIG. 3c. Further, a reading device that accesses such a copied recording medium will have severe reading problems or abort the access due to this characteristic amplitude distribution, as set out above.

Of course, many other combinations of audio sample values or digital data sample values are possible that lead to a not accessible recording medium in case of a standard modulation and that are perfectly accessible in case of a modulation according to the present invention.

In the following an example of the influencing of the merging decision according to the present invention will be given which can be used alone or be combined with the above described merging that deviates from the standard in respect to the RLL requirement.

The previously modulated n EFM words, i.e. n-bit data symbols, generated a DSV of $d_n$=2. The currently converted and therewith next to be appended n-bit data symbol n+1 itself has a DSV of $d_{n+1}$=3 or, in the inverted case, of $d_{n+1}$=−3. The last bit of the data symbol n is 0, i.e. "land". Under assumption that all four merge possibilities are possible, the merging unit has the following options:

| merge possibility | DSV of the merge bits | DSV of symbol n + 1 | sum |
|---|---|---|---|
| 0 (000) | −3 | 3 | 0 |
| 1 (001) | −2 | −3 (inversion) | −5 |
| 2 (010) | 1 | −3 (inversion) | −2 |
| 3 (100) | 3 | −3 (inversion) | 0 |

In this situation the merging unit would select the merge possibility 2, since $d_n$+sum=2+(−2)=0, i.e. the merge possibility 2 generates the lowest total DSV.

In case the random number to influence the merging decision is −2, the following influenced sums would result:

| merge possibility | sum | influenced sum |
|---|---|---|
| 0 (000) | 0 | −2 |
| 1 (001) | −5 | −7 |
| 2 (010) | −2 | −4 |
| 3 (100) | 0 | −2 |

In this situation the merging unit would select one of the merge possibilities 0 and 3, i.e. another possibility than without the randomly influenced merging decision. Therefore, also in case of repeated bit patterns, with the randomly influenced merging decision not always the same merging decision is chosen so that not always the same frequencies are generated in the spectrum of the resulting channel bits. This spreading of the generated frequencies leads to an accessible recording medium also in such a case.

In the above case the following output conditions would be strongly changed in case the merging unit would select the merging possibility 0, since in respect to the standard merging decision with merging possibility 2 all following bits would be inverted.

An appropriate series of pseudo random numbers the sum of the generated numbers might be approaching 0 which leads to a total DSV near 0.

It is also possible that an individual random number is added to each respective sum of a merging possibility and/or that first the total DSV is calculated before the random number is added and/or that for the purpose of selecting the merging possibility the value of the n-bit data symbol to be appended is randomly influences (and therewith its DSV).

FIG. 4 shows a device to produce a record carrier including a modulating device according to the present invention. The present invention is applicable to produce a recording medium on basis of a mastering process, in which case the glass master is produced with the binary data signal modulated according to the present invention, and is also suited for recording a recordable or rewritable record carrier that is already formatted. However, the modulating device according to the present invention is in both cases the same. The device to produce a record carrier shown in FIG. 4 is a burning device for recording a recordable or rewritable record carrier.

An intensity modulated laser beam 10a that is emitted from a laser 11 and is guided onto the recordable record carrier 2 by a laser head 12 exposes a recordable record carrier 2. Usually, the laser 11 and the laser head 12 are mounted on a moveable optical pickup of the recorder. The optical pickup is bi-directional coupled to a positioning unit 13 to receive a tracking signal 14, which is exemplary shown to be supplied to the laser head 12, since this laser head 12 in the end guides the writing laser beam onto the recordable record carrier 2. The positioning unit 13 receives wobble signal information of the wobble signal that is recorded as format information on the recordable optical record carrier from the optical pickup, here shown to be received from the laser head 12. The positioning unit 13 is further bi-directional coupled to a recorder controller 15a to receive a first control signal 16 and to pass over the eventually pre-processed wobble signal information. The recorder controller 15a also sends out a second control signal 17 to a spindle motor 18 according to which the recordable record carrier 2 gets rotated. The first control signal sent out from the recorder controller 15a is usually based on the wobble signal information received by said recorder controller 15a and indicates a track position of a track to be written.

The entity of optical pickup as well as positioning unit 13 and recorder controller 15a performs the above functionality to normally position the writing laser beam 10a over a wanted track position based on the pre-recorded format information, i.e. the wobble signal already recorded on the recordable or rewritable optical record carrier 2.

Channel bits 5a to be recorded, i.e. the recording channel bits, are supplied to a laser unit driver 19 that generates a recording signal 20a to drive the laser 11. A channel bit modulator 9 that receives the binary data 1a to be recorded, i.e. the recording binary data, generates the recording channel bits 5a. The channel bit modulator 9 comprises an encoder 3 that receives the recording binary data 1a, i.e. the m-bit data symbols, and supplies encoded binary data, i.e. the n-bit data symbols, to a merging unit 4 of the channel bit modulator 9, which merging unit 4 generates the recording channel bits 5a from the encoded binary data. The encoding is performed according to the standard of the recording medium to be recorded, e.g. according to the CD or DVD standard, such as an EFM encoding according to the EFM encoding table normally used for a CD recording.

The merging unit 4 comprises a bit pattern determination unit 6 according to the present invention, which receives the encoded binary data from the encoder 3 and generates possible channel bit patterns therefrom. These possible channel bit patterns are supplied to a bit pattern selection unit 7 that selects that possible channel bit pattern that generates the lowest DSV as channel bits next to be output. The selection is performed according to state of the art methods and usually based on the previously selected channel bit patterns and the possible next selections, i.e. the current DSV, a DSV evaluation of the possible channel bit patterns and a look ahead to the possible next channel bit patterns.

In particular, a DVD bit pattern determination unit that determines possible next combinations of previous channel bits and each one of the multiple n-bit data symbols generated in this case for a received m-bit symbol by the encoder 3 might be used as said bit pattern determination unit 6 in case of a DVD recording. Further, a CD bit pattern determination unit that determines the combinations of possible merging bit patterns for each one of successive n-bit data symbols and said n-bit data symbol, which is generated in this case for a received m-bit symbol by the encoder 3, might be used as said bit pattern determination unit 6 in case of a CD recording. Since the restriction for possible next combinations and/or possible merging bits is given by the minimum distance between two transitions and the maximum run length within the code, according to the present invention more possibilities are given, since the maximum run length is increased in respect to the standard and/or the merging decision is influenced as described above on basis of a random number supplied to the bit pattern determination unit 6 by a random number generator 8.

FIG. 5 shows a recording medium reading device comprising a verification device 26 according to the present invention. The reading device shown in FIG. 5 might be integrated into the device to produce a record carrier shown in FIG. 4. Therefore, some parts of the device to produce a record carrier shown in FIG. 4 that are used also for the reading functionality are also shown in FIG. 5 and are denoted by the same reference signs. However, the verification device according to the present invention might also be built into a pure reading device.

A not shown constant reading laser beam emitted from the not shown laser 11 is guided to a reading position on the recorded recordable record carrier 2. A reflected laser beam 10b is guided from the recorded recordable record carrier 2 onto a detector 22 by the laser head 12. Usually, the laser 11, the detector 22 and the laser head 12 are mounted on a moveable optical pickup of the recorder. The optical pickup is bi-directional coupled to the positioning unit 13 to receive a tracking signal 14, which is exemplary shown to be supplied to the laser head 12, since this laser head 12 in the end guides the reflected laser beam 10b onto the detector 22. The positioning unit 13 receives position information from the optical pickup, here shown to be received from the laser head 12. The positioning unit 13 is further bi-directional coupled to a player controller 15b, which might be integrally built with the recorder controller 15a, to receive the first control signal 16 to position the optical pickup and/or the laser head 12 and to pass over the eventually pre-processed position information. The player controller 15b also sends out the second control signal 17 to the spindle motor 18 according to which the recorded recordable record carrier 2 gets rotated. The first control signal sent out from the player controller 15b is usually based on a tracking error signal derived from said eventually pre-processed position information 16 received by said player controller 15b.

The entity of optical pickup as well as positioning unit 13 and player controller 15b performs the above functionality to normally position the reading laser beam over a wanted track position based on the track of the recorded data, i.e. the asynchronous data stream recorded on the recordable or rewritable optical record carrier 2.

The detector 22 converts the reflected laser beam 10b to a reading signal 20b, which corresponds to the recording signal 20a and is supplied to a reading signal evaluation unit 21. Within the reading signal evaluation unit 21 a channel bit generator 23 derives received channel bits 5b from the reading signal 10b. A clock generator of the reading signal evaluation unit 21 supplies a clock signal to the player controller 15b, which is based on these received channel bits 5b, in particular on the received synchronization patterns and the minimum distance between two transitions. Further, a data filter and decoder 25 of the reading signal evaluation unit 21 removes everything but the n-bit data symbols from the received channel bits 5b, decodes the n-bit data symbols into the corresponding m-bit data symbols that are output as the received binary data 1b, which corresponds to the recording binary data 1a.

In particular, a CD data filter and decoder removes the synchronization patterns, the merging bits, and the subcode data from the received channel bits 5b to generate the n-bit data symbols in case of a CD or CD like recording, and a DVD data filter and decoder removes the synchronization patterns from the received channel bits 5b to generate the n-bit data symbols in case of a DVD or DVD like recording.

The reading signal evaluation unit 21 further comprises a channel bit evaluator 26 according to the present invention that also receives the received channel bits 5b and that generates a standard deviation and/or characterizing spectral distribution signal 27 therefrom, e.g. a maximum run length evaluation signal. Such a maximum run length evaluation signal might e.g. be an indication signal whether or not the maximum run length defined in the corresponding standard for the read recording medium 2 is exceeded, or it might indicate the maximum run length itself.

The channel bit evaluator 26 according to the present invention might be integrated on one chip with the other parts of the reading signal evaluation unit 21 and/or even with the player controller 15b.

The channel bit evaluator 26 according to the present invention might further be connected to the player controller 15b to instruct the access of a predetermined pattern or at least one predetermined position on the recording medium for evaluating the run length of the channel bits, and/or the influenced merging, and/or the characteristic spectral distribution in these accessed areas only. The predetermined pattern or the at least one predetermined position might be indicated to the channel bit evaluator 26 according to the present invention by the recording medium 2 to be verified and/or might be predefined.

The copy protection method according to the present invention might be combined with other copy protection methods.

Therefore, the present invention is without any limitations applicable to CD and DVD recording media, i.e. recording media that are recorded to any current or future CD or DVD standard. Further, the present invention is also applicable to recording media of any other comparable standard.

The invention claimed is:

1. Method for modulating digital binary data to be recorded on a recording medium, said method including the steps of:
generating channel bits of the digital binary data to be recorded according to a standard for the recording medium including a step of inserting a merging bit pattern between two n-bit data symbols that generates a lowest digital sum value and/or an equally distributed spectral distribution of the channel bits, with an exception that a merging decision which merging bit pattern is to be inserted is influenced on basis of a random number or a pseudo-random number in a predetermined pattern or in at least one predetermined position on said recording medium.

2. Method according to claim 1, including the steps of:
converting a next to be processed m-bit data-symbol of the digital binary data into a currently converted n-bit data symbol, where m and n are positive integers and m<n, according to an encoding table used for producing a compact disc,
determining of all merging bit patterns that can be inserted between previously converted and the currently converted n-bit data symbols,
adding a random or pseudo random number to the currently converted n-bit data symbol to obtain an influenced n-bit data symbol,
determining a respective digital sum value and/or a respective spectral distribution of the channel bits for every possibility of appending said influenced n-bit data symbol to said previously converted n-bit data symbols and a respective merging bit pattern, and
choosing that merging bit pattern to be inserted between the previously converted and the currently converted n-bit data symbols that generates the lowest digital sum value and/or an equally distributed spectral distribution of the channel bits.

3. Method according to claim 1, including the steps of:
converting a next to be processed m-bit data-symbol of the digital binary data into a currently converted n-bit data symbol, where m and n are positive integers and m<n, according to an encoding table used for producing a compact disc,
determining of all merging bit patterns that can be inserted between previously converted and the currently converted n-bit data symbols,
determining a respective digital sum value for every possibility of appending said currently converted n-bit data symbol to said previously converted n-bit data symbols and a respective merging bit pattern,
adding a random or pseudo random number to each of the respective digital sum values to obtain influenced digital sum values, and choosing that merging bit pattern to be inserted between the previously converted and the currently converted n-bit data symbols that generates the lowest influenced digital sum value and/or an equally distributed spectral distribution of the channel bits.

4. Method according to claim 1, including the steps of:
converting a next to be processed m-bit data symbol of the digital binary data into a predetermined number of different n-bit data symbols, where m and n are positive integers and m<n, according to an encoding scheme used for producing a digital versatile disc,
adding a random or pseudo random number to each of the respective n-bit data symbols to obtain influenced n-bit data symbols,
determining a respective digital sum value and/or a respective spectral distribution of the channel bits for every possibility for appending a respective one of said influenced n-bit data symbols to previously selected n-bit data symbols, and
choosing the n-bit data symbol to generate the channel bits which corresponding influenced n-bit data symbol generate the lowest digital sum value and/or an equally distributed spectral distribution of the channel bits.

5. Method according to claim 1, including the steps of:
converting a next to be processed m-bit data symbol of the digital binary data into a predetermined number of different n-bit data symbols, where in and n are positive integers and m<n, according to an encoding scheme used for producing a digital versatile disc,
determining a respective digital sum value for every possibility for appending a respective one of said n-bit data symbols to previously selected n-bit data symbols,
adding a random or pseudo random number to each of the respective digital sum values to obtain influenced digital sum values, and choosing the n-bit data symbol to generate the channel bits that generates the lowest influenced digital sum value and/or an equally distributed spectral distribution of the channel bits.

6. Method according to claim 1, characterized in that the channel bits of the digital binary data to be recorded are generated according to the standard for the recording medium with the exception that a maximum run length larger than that defined in the standard is generated in a predetermined pattern or in at least one predetermined position on said recording medium.

7. Method for verifying a recording medium, said method including the steps of:
determining whether or not a merging decision which merging bit pattern is to be inserted between two n-bit data symbols for generating a lowest digital sum value and/or an equally distributed spectral distribution of channel bits recorded in a predetermined pattern or at least one predetermined position on said recording medium is influenced on basis of a random number or a pseudo-random number.

8. Method for copying digital binary data recorded on an original recording medium onto a recordable recording medium, said method including the steps of:
evaluating whether or not a merging decision which merging bit pattern is to be inserted between two n-bit data symbols for generating a lowest digital sum value and/or an equally distributed spectral distribution of channel bits recorded in a predetermined pattern or at least one predetermined position on said recording medium is influenced on basis of a random number or a pseudo-random number, and
generating channel bits to be recorded in a corresponding predetermined pattern or at least one corresponding predetermined position on said recordable recording medium in which the merging decision which merging bit pattern is to be inserted is influenced on basis of a random number or a pseudo-random number.

9. Device for modulating digital binary data to be recorded on a recording medium, comprising:
an encoder to convert a next to be processed m-bit data-symbol of the digital binary data into at least one currently converted n-bit data symbol, where m and n are positive integers and m<n, according to an encoding table normally used for producing said recording medium,
characterized by
a merging unit to combine one of the at least one currently converted n-bit data symbol with previously converted n-bit data symbols by inserting a merging bit pattern that generates a lowest digital sum value and/or an equally distributed spectral distribution of channel bits according to a standard for the recording medium with the exception that the merging decision which merging bit pattern is to be inserted is influenced on basis of a random number or a pseudo-random number in a predetermined pattern or in at least one predetermined position on said recording medium.

10. Device according to claim 9, characterized in that said merging unit comprises:
a first determination unit for determining of all merging bit patterns that can be inserted between the previously converted and the currently converted n-bit data symbols,
an adding unit for adding a random or pseudo random number to the currently converted n-bit data symbol to obtain an influenced n-bit data symbol,
a second determining unit for determining a respective digital sum value and/or a respective spectral distribution of the channel bits for every possibility of appending said influenced n-bit data symbol to said previously converted n-bit data symbols and a respective merging bit pattern, and
a selection unit for choosing that merging bit pattern to be inserted between the previously converted and the currently converted n-bit data symbols that generates the lowest digital sum value and/or an equally distributed spectral distribution of the channel bits.

11. Device according to claim 9, characterized in that said merging unit comprises:
a first determination unit for determining of all merging bit patterns that can be inserted between previously converted and the currently converted n-bit data symbols,
a second determining unit for determining a respective digital sum value for every possibility of appending said currently converted n-bit data symbol to said previously converted n-bit data symbols and a respective merging bit pattern,
an adding unit for adding a random or pseudo random number to each of the respective digital sum values to obtain influenced digital sum values, and
a selection unit for choosing that merging bit pattern to be inserted between the previously converted and the currently converted n-bit data symbols that generates the lowest influenced digital sum value and/or an equally distributed spectral distribution of the channel bits.

12. Device according to claim 9, characterized in that said merging unit comprises:
an adding unit for adding a random or pseudo random number to each of the respective n-bit data symbols to obtain influenced n-bit data symbols,
a second determining unit for determining a respective digital sum value and/or a respective spectral distribution of the channel bits for every possibility for appending a respective one of said influenced n-bit data symbols to previously selected n-bit data symbols, and
a selection unit for choosing the n-bit data symbol to generate the channel bits which corresponding influenced n-bit data symbol generate the lowest digital sum value and/or an equally distributed spectral distribution of the channel bits.

13. Device according to claim 9, characterized in that said merging unit comprises:
a second determining unit for determining a respective digital sum value for every possibility for appending a respective one of said n-bit data symbols to previously selected n-bit data symbols,
an adding unit for adding a random or pseudo random number to every respective digital sum value to obtain respective influenced digital sum values, and a selection unit for choosing the n-bit data symbol to generate the channel bits that generates the lowest influenced digital sum value.

14. Device according to claim 9, wherein said merging unit operates to combine one of the at least one currently converted n-bit data symbol with previously converted n-bit data symbols according to a standard for the recording medium with the exception that a maximum run length larger than that defined in the standard is generated in a predetermined pattern or in at least one predetermined position on said recording medium.

15. Device for verifying a recording medium comprising:
a detector configured to detect channel bits read from a recording medium; and
an evaluation unit configured to determine whether or not a merging decision which merging bit pattern is to be inserted between two n-bit data symbols for generating a lowest digital sum value and/or an equally distributed spectral distribution of channel bits recorded in a predetermined pattern or at least one predetermined position on said recording medium is influenced on basis of a random number or a pseudo-random number.

16. Device for copying digital binary data recorded on an original recording medium onto a recordable recording medium, comprising:
a searching unit for evaluating whether or not a merging decision which merging bit pattern is to be inserted between two n-bit data symbols for generating a lowest digital sum value and/or an equally distributed spectral distribution of channel bits recorded in a predetermined pattern or at least one predetermined position on said recording medium is influenced on basis of a random number or a pseudo-random number; and
a generator for generating channel bits to be recorded in a corresponding predetermined pattern or at least one corresponding predetermined position on said recordable recording medium in which the merging decision which merging bit pattern is to be inserted is influenced on basis of a random number or a pseudo-random number.

17. A recording medium having computer readable instructions, characterized in that at least a part of the recorded channel bits corresponding to the recorded digital binary data deviate from a standard for the recording medium in that they show a maximum run length larger than that defined in the standard and/or in that it comprises a recording area in which a merging decision where a merging bit pattern is to be inserted by a processor between two n-bit data symbols for generating with the processor a lowest digital sum value and/or an equally distributed spectral distribution of channel bits recorded in a predetermined pattern or at least one predetermined position is influenced on basis of a random number or a pseudo-random number and/or by comprising at least one part comprising at least one predetermined repetitive bit pattern which according to the standard for the recording medium, encodes into channel bits having a spectral distribution that shows at least one range of frequencies with a characteristic amplitude distribution.

\* \* \* \* \*